United States Patent [19]
Flatland

[11] 3,994,544
[45] Nov. 30, 1976

[54] BEARING FOR A HIGH SPEED AIR TURBINE

[76] Inventor: Lloyd P. Flatland, Quisisana Drive, Kentfield, Calif. 94904

[22] Filed: Aug. 5, 1974

[21] Appl. No.: 494,541

[52] U.S. Cl. .................. 308/187.1; 277/212 C; 308/188; 308/201
[51] Int. Cl.² ........................................ F16C 1/24
[58] Field of Search ............ 308/187, 187.1, 187.2, 308/188, 202, 216, 217; 277/212 C

[56] References Cited
UNITED STATES PATENTS

| | | | |
|---|---|---|---|
| 2,000,276 | 5/1935 | Delaval-Crow | 308/187.1 |
| 2,755,113 | 7/1956 | Baumheckel | 308/187.1 |
| 2,888,303 | 5/1959 | Mempel | 308/187.1 |
| 3,028,203 | 4/1962 | Lund et al. | 308/187.1 |
| 3,169,809 | 2/1965 | Pendleton | 308/187.1 |
| 3,311,430 | 3/1967 | Christensen et al. | 308/187.1 |
| 3,642,335 | 2/1972 | Takahashi et al. | 308/187.1 |
| 3,858,950 | 1/1975 | Otto | 308/187.1 |

FOREIGN PATENTS OR APPLICATIONS

| | | | |
|---|---|---|---|
| 468,301 | 9/1950 | Canada | 308/187.1 |

*Primary Examiner*—M. H. Wood, Jr.
*Assistant Examiner*—Richard A. Bertsch
*Attorney, Agent, or Firm*—Lothrop & West

[57] ABSTRACT

A bearing for a high speed air turbine includes an inner race having and exterior ball groove. An outer race has an interior ball groove. Bearing balls in the grooves are engaged by a retainer between the outer and inner races. Each of a pair of sealing rings has an outer flange disposed in part between the outside of the retainer and the outer race. The inner edge of the outer flange is very close to the balls. Each of the rings also has a radial flange extending from the outer flange toward the inner race, passing the retainer and having a terminus spaced very close to the outer surface of the inner race.

6 Claims, 2 Drawing Figures

U.S. Patent   Nov. 30, 1976   3,994,544
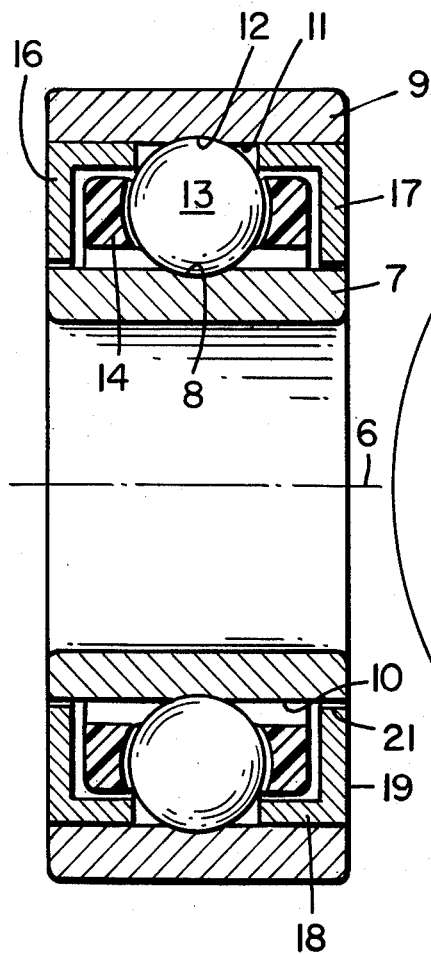
FIG_1
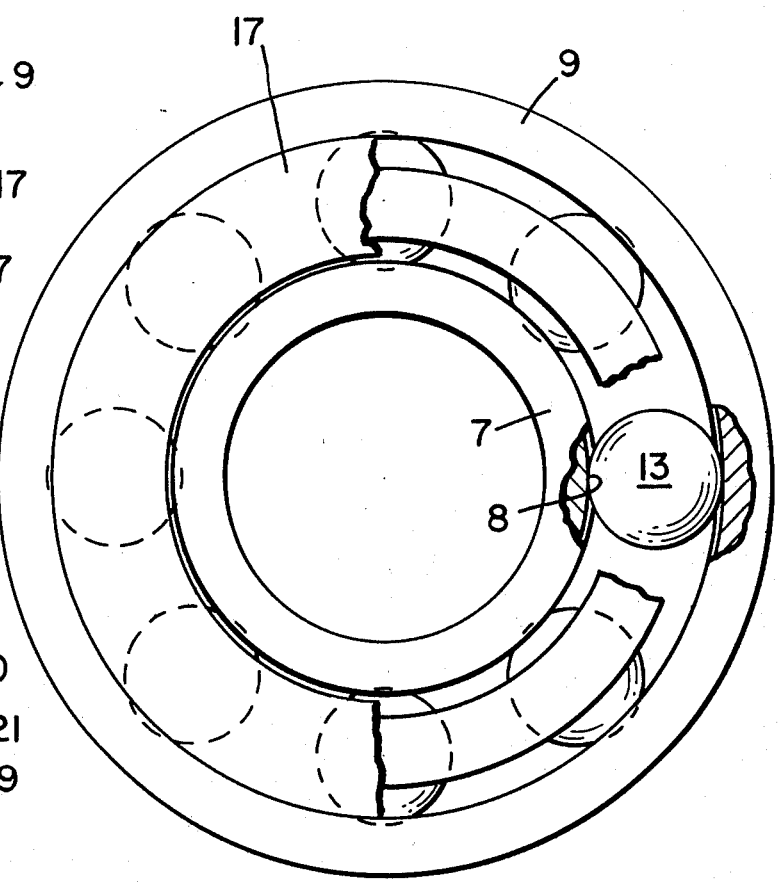
FIG_2

BEARING FOR A HIGH SPEED AIR TURBINE

In some high speed, small air turbines; for example, of the sort utilized for driving dental handpieces and the like, and in which the speeds of air turbine operation are of the order of several hundred thousand revolutions per minute, say, 430,000 revolutions per minute, it is customary to mount the air turbine shaft on at least one ball bearing and usually on two ball bearings. While commercial ball bearings are available in the small sizes (balls about 1 millimeter in diameter) necessary for this type of operation, they sometimes have very short lives and tend to make the remainder of the air turbine mechanism unsatisfactory. Also, the turbine, because of its bearings, sometimes does not rotate truly. At the high speeds involved there develop various vibrations, chattering motions and the like that are transmitted to the dental tool, such as a drill or burr, with quite unsatisfactory results. The lubrication of bearings of this sort is usually by means of a lubricant such as oil entrained in the air utilized to drive the turbine and some of which, at least, is passed through the turbine bearings. The lubricant itself sometimes causes difficulty. It may feed irregularly or be disposed unevenly and so produce some intermittent unbalance in the bearings. It may tend to collect in areas wherein its presence is highly detrimental. Upon occasion, it may upset the otherwise satisfactory operation of the bearing structure.

It is to overcome most or all of these difficulties that I have provided an improved bearing, preferably one able to operate with grease rather than an oil mist as a lubricant.

It is therefore an object of the invention to provide a bearing for a high speed air turbine in which the parts of the bearing are disposed so as to facilitate the bearing operation and particularly to make sure that the lubrication of the bearing is initially proper and is maintained in a satisfactory condition over a protracted period.

Another object of the invention is to provide a bearing for a high speed air turbine, in which the bearing is nearly closed but in which there can be a flow of air into and perhaps through the bearings, depending upon the installation, in such a fashion as to insure protracted, vibration free and chatter free operation of the bearing.

A further object of the invention is in general to provide an improved bearing for a high speed air turbine.

Other objects, together with the foregoing, are attained in the embodiment of the invention described in the accompanying description and illustrated in the accompanying drawings, in which:

FIG. 1 is a cross-section on a greatly enlarged scale through an air bearing constructed pursuant to the invention, the plane of section being on an axial and diametrical plane;

FIG. 2 is a side elevation of the bearing of FIG. 1, but with various different portions broken away to disclose several parts of the interior construction.

A typical environment for the presently disclosed bearing is shown in the air turbine incorporated in a dental handpiece disclosed in my co-pending patent application entitled DENTAL HANDPIECE, filed Apr. 8, 1974 with Ser. No. 458,792. In that environment there is provided a housing surrounding a turbine shaft with the shaft located with respect to the housing by being supported in ball bearings. Herein, a representative bearing is designed to rotate about an axis 6 while it is installed within a housing (not shown). The bearing includes an inner, annular race 7 usually of metal and carefully dimensioned so as to fit on a shaft (not shown) concentric with the axis 6 so that the inner race and the shaft rotate concentrically and together. The inner race 7 is relatively long in an axial direction and includes a circular cylindrical outer surface 10 and a central, peripheral groove 8.

In a somewhat comparable fashion there is also provided an outer, annular race 9 also usually constructed of metal and designed to be disposed within the housing so that the outer surface of the outer race is concentric with the axis 6. Also, the outer race is in part defined by an inner, circular cylindrical surface 11 concentric with the axis 6 and including a central, interior groove 12 opposite the groove 8. Disposed within the two grooves is a plurality of bearing balls 13 in the customary fashion. The balls are partly located and spaced by means of an annular retainer 14 which conveniently can be made in one piece, preferably of an anti-friction, plastic material, such as Teflon. The retainer can be made of two halves which are secured together so that the retainer 14 generally encompasses the various balls 13 and is freely disposed with adequate spacing between the inner race and the outer race. The retainer extends axially a substantial distance across the races but stops short of the edges of the races to leave substantial remaining space. The retainer is effective to hold the balls generally in position circumferentially each with respect to the other so that their spacing preferably is maintained with reasonable regularity.

Particularly in accordance with this invention there are additionally provided a pair of sealing rings 16 and 17. These rings are substantially identical so that the description of one applies also to the other. Each ring in elevation is annular but in diametrical cross-section is substantially L-shaped, as defined by an outer flange 18 and a radial flange 19. Each sealing ring is preferably an integral body and preferably is of solid, metallic material, such as aluminum, although that metal is not essential. Each ring is preferably sized and formed so that it can be pressed lightly into the outer race with a relatively close fit between the outer surface of the sealing ring and the inner surface of the outer race. The fit is close enough so that there is no likelihood of air or grease lubricant leakage between the mating surfaces under the normal pressures of ordinary operation. Furthermore, the size or volume of the outer flange 18 is such that the flange extends between or is interspersed between the outside of the retainer and the inside of the outer race. There is very little clearance therebetween. Also, the corner of the outer flange 18 extends into the immediate vicinity of the ball 13 with almost no clearance between them. For clarity in the drawings the clearances are exaggerated.

Extending radially from the integral outer flange 18, the radial flange 19 extends to be substantially flush with the ends of the inner and outer races. The flange 19 overlies in an axial direction the side of the retainer and terminates very close to the outer surface of the inner race, there being but a slight clearance therebetween. The inner part of the radial flange 19 has an inner terminus 21 defined by an interior, circular cylindrical surface spaced but a slight distance from the outer cylindrical surface of the inner race, leaving but a very slight clearance therebetween but nevertheless being out of contact with the outer surface of the inner race.

With this arrangement, there is no rubbing or frictional contact between the terminus 21 of the sealing ring and the inner race, so that there is no localized heat development at that location. Furthermore the slight clearance is sufficient to permit some in and out flow of air. This air sometimes acts as a partial lubricant. A specific oily lubricant, usually grease, is introduced periodically into the interior of the structure. Any excess can flow out of the other clearance space between the other radial flange and the inner race. The lubricant grease tends to be thrown out in a radial direction by centrifugal force and is generally directed axially inwardly toward the center groove 12 of the bearing and into contact with the balls 13. Some of the grease in traveling to that location also intervenes between the balls and the retainer. Some of the grease is confined against the balls and in the groove 12 by the closely spaced, axially facing ends of the flanges 18.

It has been found that with this arrangement that the amount of lubricant gathered in a body radially outwardly of the bearing balls is adequate although relatively small because of the flanges 18. The balance is not adversely affected.

Centrifugal force tends to prevent escape of lubricant through the narrow space radially inward of the flange 19 although thermal breathing through such space can occur.

Actual experience with bearings constructed as disclosed herein shows that more than a two hundred fifty hour life is readily attainable. This, at the normal operating speed amounts to over 6 billion revolutions, a linear distance of about 125,000 miles per ball. The operation is notably smooth, chatter free and quiet. There appear to be no lubrication or thermal problems, partially due to the use of high conducting aluminum, air breathing and closely confined lubricant grease.

What is claimed is:

1. A bearing for a high speed air turbine comprising an inner annular race having a circular-cylindrical outer surface and a central exterior ball groove; a surrounding outer annular race having a circular-cylindrical inner surface and a central interior ball groove; a plurality of bearing balls disposed in said grooves; an annular retainer disposed radially between said outer race and said inner race and having facing surfaces adapted to interengage with the sides of said bearing balls; and a pair of sealing rings, each of said rings having an outer flange resting against said inner surface and interposed in part between the radially outside portion of said retainer and the inside of said outer race and having a corner extending into the immediate vicinity of said balls, each of said rings also having a radial flange extending radially from said outer flange toward said inner race, said radial flange overlying the side of said retainer and having a terminus just short of said outer surface.

2. A bearing as in claim 1 in which said terminus is in part defined by a circular-cylindrical flange surface concentric with said outer surface.

3. A bearing as in claim 1 in which each of said rings is an integral member having an outer flange and a radial flange disposed at right angles to each other.

4. A bearing as in claim 1 in which said outer flange of each of said rings occupies a large part of the radial space between the radially outer portion of said retainer and said inner surface.

5. A bearing as in claim 1 in which said outer flange extends axially from an end face of said outer race into the immediate vicinity of said balls.

6. A bearing as in claim 5 in which said retainer is disposed radially inside said outer flange.

* * * * *